SETH KINMAN, OF EUREKA, CALIFORNIA.

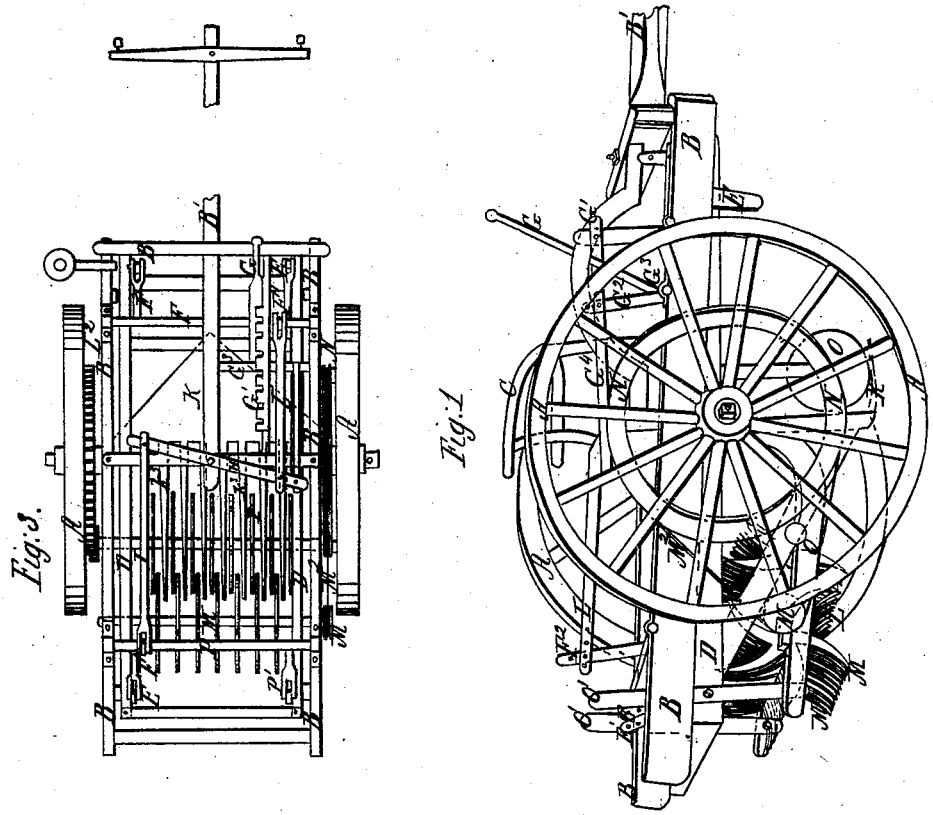

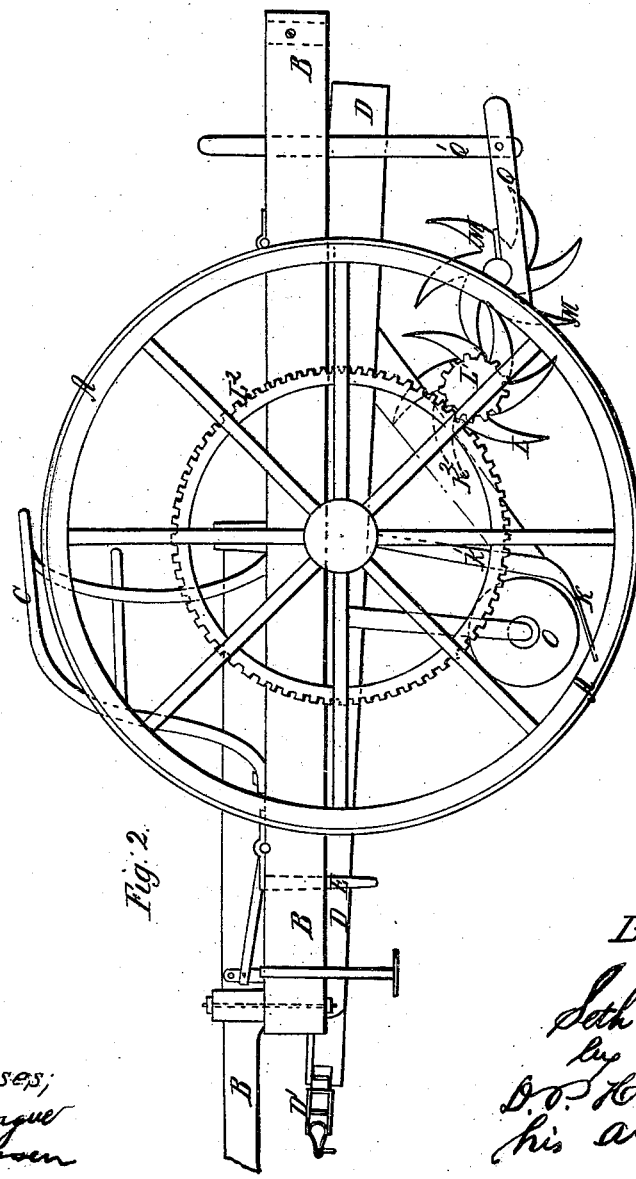

Letters Patent No. 85,833, dated January 12, 1869.

IMPROVEMENT IN POTATO-DIGGER.

The Schedule referred to in these Letters Patent and making part of the same.

*To all whom it may concern:*

Be it known that I, SETH KINMAN, of Eureka, in the county of Humboldt, and State of California, have invented a new and useful Improvement in Potato-Diggers; and I do hereby declare that the following is a full, clear, and exact description of the same, reference being had to the annexed drawings, making part of this specification, in which—

Figure 1 is a perspective view;

Figure 2 is a side elevation; and

Figure 3 is a plan.

The same letters in all the figures are used to designate the same parts.

The machine runs upon two wheels, A A, carrying over their axle the main frame B, to which is attached the tongue B', and which supports the driver's seat C.

A supplemental frame, D, is suspended from the main frame by rods, E, placed at the corners, and perforated with a series of holes, so that the height of the supplementary frame may be regulated as desired.

These rods are attached by pins to the crank-arms $F^1$, projecting from the shafts F resting on the main frame.

The height of the supplementary frame may also be adjusted by means of the lever G, which is held in any required position by the notched arc $G^1$.

This lever turns a shaft, $G^2$, to which there is attached an arm, $G^3$, connected, by the rod $G^4$, with one end of the lever H, the latter being pivoted at the centre to the main frame.

The oscillation of the lever H is communicated, by the connecting-rods I I, to the shafts F, said rods being adjustably attached by pins to arms $F^2$, projecting from the shafts F.

By means of the mechanism described, the supplementary frame may be raised or lowered, for the purpose of adjusting the depth of the shovel K attached to said frame, by rigid braces, $K^1$ and $K^2$.

The shovel is a triangular blade of steel, so inclined as to run under the hills of potatoes, and, with the forward motion of the machine, to raise the bulbs above the ground.

Fingers $K^3$ are attached to the rear and upper edge of the shovel, inclined upward at an angle of, say, thirty degrees to forty degrees.

A shaft, containing a series of wheels, L, with curved arms, is placed under and behind the braces $K^2$, the journals of which are supported in the braces Q.

The wheels L are so set, that the arms shall pass between the fingers $K^3$, and, as the wheel revolves, serve to raise the potatoes over the upper ends of the fingers $K^3$.

The wheel L is driven by a pinion, $L^1$, which meshes into the cogs of a spur-wheel, $L^2$.

Behind the wheel L, is another wheel, M, with arms, similarly constructed, moving between those of the arms of the wheel L.

The wheel M is made to revolve in a direction contrary to that of the revolution of the wheel L, by means of a pulley, $M^1$, and band, $M^2$, the latter passing over a pulley on the other wheel, A.

The arms of the wheel M do not reach to the shaft of the wheel L, but a space is left between them, sufficient to allow the potatoes to fall through upon the ground.

The braces Q are curved upward in front, and fastened to the axle, the rear end being supported upon rods Q' attached to the supplementary frame.

Sharp-edged steel wheels O are fastened on bifurcated rods hanging from the supplementary frame D, and are intended to cut the vines on each side of the shovel.

The double-tree D' is attached to the front end of the supplementary frame D, the tongue being attached to the frame, so that the movement of the team will tend to shake the supplementary frame, and facilitate the discharge of the dirt taken up with the potatoes.

What I claim as my invention, and desire to secure by Letters Patent, is—

1. The combination, of the shovel K with fingers $K^3$, the two vine-cutters O O, and the two oppositely-revolving wheels L and M, constructed and arranged, in relation to one another, substantially as set forth.

2. The combination of the supplementary frame D, to which are attached the shovel and other mechanism for taking the potatoes out of the earth, and the main frame B, when the double-tree D' is attached to the former, and the tongue B' to the latter, substantially as and for the purpose set forth.

3. The combination of the main and supplementary frames with the system of levers, shafts, and arms, for regulating the depth of the plow attached to the latter frame, substantially as set forth.

4. The combination of the main frame and supplementary frame, and the perforated rods E, for adjusting the relative position of the two frames, substantially as set forth.

In testimony whereof, I have signed my name to this specification, in the presence of two subscribing witnesses.

SETH KINMAN.

Witnesses:
W. T. OLMSTEAD,
GEO. K. HENEY.